United States Patent [19]

Ukai et al.

[11] Patent Number: 5,294,709

[45] Date of Patent: Mar. 15, 1994

[54] METHINE COMPOUNDS AND METHINE DYES

[75] Inventors: Toshinao Ukai; Yoshio Inagaki, both of Kanagawa, Japan

[73] Assignee: Fuji Photo Film Co., Ltd., Kanagawa, Japan

[21] Appl. No.: 4,497

[22] Filed: Jan. 14, 1993

Related U.S. Application Data

[63] Continuation of Ser. No. 793,298, Nov. 14, 1991, abandoned, which is a continuation of Ser. No. 486,623, Feb. 28, 1990, abandoned.

[30] Foreign Application Priority Data

Feb. 28, 1989 [JP] Japan ................................. 1-46843
Feb. 28, 1989 [JP] Japan ................................. 1-46845

[51] Int. Cl.$^5$ ............... C07D 487/02; C07D 277.62; C07D 263/58; C07D 209/12
[52] U.S. Cl. ..................................... 544/263; 544/209; 544/331; 546/119; 546/175; 548/121; 548/141; 548/142; 548/150; 548/156; 548/159; 548/163; 548/179; 548/183; 548/185; 548/219; 548/254; 548/220
[58] Field of Search ........................................ 544/263

[56] References Cited

U.S. PATENT DOCUMENTS

| | | | |
|---|---|---|---|
| 2,282,115 | 5/1942 | Brooker et al. | 548/150 |
| 2,440,119 | 4/1948 | Riester | 546/175 |
| 2,443,136 | 6/1948 | Heimbach | 544/263 |
| 2,504,616 | 4/1950 | Anish | 548/179 |
| 3,622,317 | 11/1971 | Bird et al. | 548/156 |
| 3,656,957 | 4/1972 | Oliver et al. | 430/578 |
| 3,793,034 | 2/1974 | Sato et al. | 430/588 |
| 3,933,507 | 1/1976 | von Konig et al. | 430/570 |
| 3,976,493 | 8/1976 | Borror et al. | 430/579 |
| 3,976,640 | 8/1976 | Borror et al. | 548/121 |
| 4,110,116 | 8/1978 | Beretta et al. | 430/547 |
| 4,596,767 | 6/1986 | Mihara et al. | 430/576 |
| 4,634,653 | 1/1987 | Toya et al. | 430/217 |
| 4,652,645 | 3/1987 | Stingelin et al. | 544/198 |
| 4,720,451 | 1/1988 | Shuto et al. | 430/379 |
| 4,987,064 | 1/1991 | Saitou et al. | 430/570 |
| 5,032,500 | 7/1991 | Ikeda et al. | 430/570 |

OTHER PUBLICATIONS

R. L. Parton et al. "Dimerization Reactors of Cyanine Radical Directions" J. Org. Chem. (1990) 55 49–57.
F. Latif et al. "Synthesis of New Benzimidazoles as Potential . . . " J. Chem. Soc. Pak. (1984) 6 153–160.

Primary Examiner—Mukund J. Shah
Assistant Examiner—Matthew V. Grumbling

[57] ABSTRACT

Methine compounds represented by the following general formula (Ia) or (Ib);

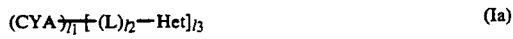

(Ia)

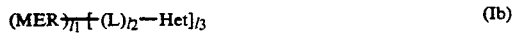

(Ib)

wherein CYA represents atoms having a cyanine chromogen structure, MER represents atoms having a merocyanine chromogen structure, L represents a divalent linkage group composed of an atom or atoms containing at least one of a carbon atom, a nitrogen atom, a sulfur atom and an oxygen atom, Het represents a group containing a 5- to 7-membered hetero ring containing at least one nitrogen atom, $l_1$ represents 1 or 2, $l_2$ represents 0 or 1, and $l_3$ represents 1, 2 or 3. Methine dyes using same are also disclosed.

2 Claims, No Drawings

METHINE COMPOUNDS AND METHINE DYES

This is a continuation of application Ser. No. 07/793,298 filed Nov. 14, 1991, abandoned, which is a continuation of application Ser. No. 07/486,623 filed Feb. 28, 1990, abandoned.

FIELD OF THE INVENTION

The present invention relates to novel methine compounds useful as colorants and methine dyes (dye-stuffs) using the same.

BACKGROUND OF THE INVENTION

Various cyanine dyes and merocyanine dyes have conventionally been known. Examples thereof are described in, for example, F. M. Hamer, *Cyanine Dyes and Related Compounds* (Ed. A. Weissberger, 1964, Wiley Interscience (New York)); G. E. Ficken, *The Chemistry of Synthetic Dyes*, vol. 4, Chapter V, 1971 (Ed. K. Venkataraman, Academic Press (New York and London)); and D. M. Sturmer, *The Chemistry of Heterocyclic Compounds* (Ed. A. Weissberger and E. C. Taylor, 1977, John Wiley and Sons (New York)). These compounds adsorb a heavy metal or heavy metal ion, but have disadvantages such as transferring, diffusion and elution when they are used as dyes. A compound which can adsorb a heavy metal or a heavy metal ion strongly has been desired.

The chromogen structure of the cyanine dyes comprises two of the so-called basic nuclei linked to each other through a conjugated double bond chain. However, those cyanine dyes which have as substituent linked to this cyanine chromogen structure a nitrogen-containing heterocyclic group or groups, particularly a nitrogen-containing heterocyclic group or groups capable of chemically or physically adsorbing a heavy metal such as silver ion, have not been known.

Likewise, the chromogen structure of the merocyanine dyes comprises a so-called acidic nucleus and a basic nucleus linked to each other through a conjugated double bond chain. However, those merocyanine dyes which have as a substituent linked to this merocyanine chromogen structure a nitrogen-containing heterocyclic structure or structures, particularly a nitrogen-containing heterocyclic structure or structures capable of chemically or physically adsorbing a heavy metal such as silver ion, have not been known.

SUMMARY OF THE INVENTION

An object of the present invention is to provide novel compounds having as a substituent a nitrogen-containing heterocyclic group or groups capable of chemically or physically adsorbing a heavy metal or heavy metal ion and cyanine dyes (dyestuffs) using the same.

Another object of the present invention is to provide novel compounds having as a substituent a nitrogen-containing heterocyclic group or groups capable of chemically or physically adsorbing a heavy metal or heavy metal ion and merocyanine dyes (dyestuffs) using the same.

These and other objects of the present invention will become apparent from the following description thereof.

The above-described and other objects of the present invention are attained by the novel methine compounds and methine dyes represented by the following general formula (Ia) or (Ib):

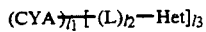  (Ia)

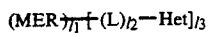  (Ib)

wherein CYA represents atoms having a cyanine chromogen structure, MER represents atoms having a merocyanine chromogen structure, L represents a divalent linkage group composed of an atom or atoms containing at least one of a carbon atom, a nitrogen atom, a sulfur atom and an oxygen atom, Het represents a group containing a 5- to 7-membered hetero ring containing at least one nitrogen atom, $l_1$ represents 1 or 2, $l_2$ represents 0 or 1, and $l_3$ represents 1, 2 or 3. Additionally, the hetero ring represented by Het may further contain a hetero atom or atoms other than the nitrogen atom.

DETAILED DESCRIPTION OF THE INVENTION

In the general formula (Ia), the group represented by CYA is a group having a cyanine dye structure wherein a nitrogen-containing heterocyclic nucleus called a basic nucleus is linked to another nitrogen-containing heterocyclic nucleus through a conjugated double bond so as to form a conjugation system.

Examples of the cyanine dyes are described in, for example, T. H. James, *Theory of the Photographic Process*, Chapter 8 (1977, Macmillan Co.) and Examples of preferable basic nuclei to be used in these cyanine dyes include oxazoline, oxazole, benzoxazole, naphthoxazole, thiazoline, thiazole, benzothiazole, naphthothiazole, dihydronaphthothiazole, selenazoline, selenazole, benzoselenazole, naphthoselenazole, 3H-indole, benzindole, imidazoline, imidazole, benzimidazole, naphthoimidazole, pyridine, quinoline, imidazo[4,5-b]quinoxaline, pyrrolidine, tellurazole, benzotellurazole, and naphthotellurazole.

In the general formula (Ib), the group represented by MER is a group wherein an electron attractive group called an acidic nucleus is linked to an electron donative group called a basic nucleus through a conjugated double bond so as to form a conjugation system wherein the carbonyl group in said acidic nucleus can conjugate with the nitrogen atom in said basic nucleus.

Examples of the acidic nuclei, basic nuclei and combinations thereof are described in, for example, T. H. James; *Theory of the Photographic Process* (1977, Macmillan Co.), Chapter 8. Preferable specific examples of the acidic nuclei include 2,4-oxazolidinedione, 2,4-thiazolidinedione, 2-thio-2,4-oxazolidinedione, rhodanines, hydantoin, 2-thiohydantoin, 2-pyrazolin-5-ones, 2-isoxazolin-5-ones, 3,5-pyrazolidinedione, 1,3-indanedione, 1,3-dioxane-4,6-dione, 1,3-cyclohexanedione, 2-thioselenazolidine-2,4-diones, barbituric acid, and 2-thiobarbituric acid. On the other hand, preferable specific examples of the basic nuclei include those basic heterocyclic nuclei commonly used for cyanine dyes such as oxazoline, oxazole, benzoxazole, naphthoxazole, thiazoline, thiazole, benzothiazole, naphthothiazole, dihydronaphthothiazole, selenazline, selenazole, benzoselenazole, naphthoselenazole, 3H-indole, benzindole, imidazoline, imidazole, benzimidazole, naphthoimidazole, pyridine, quinoline, imidazo[4,5-b]quinoxaline, pyrrolidine, teelurazole, benzotellurazole, and naphthotellurazole.

L represents a divalent linkage group composed of an atom or atoms containing at least one of carbon atom, nitrogen atom, sulfur atom and oxygen atom.

Preferably, L represents a divalent linkage group containing up to 20 carbon atoms and constituted by one, or a combination, of an alkylene group (e.g., methylene, ethylene, propylene, butylene, or pentylene}, an arylene group (e.g., phenylene or naphthylene), an alkenylene group (e.g., ethenylene or propenylene), a sulfonyl group, a sulfinyl group, a thioether group, an ether group, a carbonyl group,

(wherein $R^1$ represents a hydrogen atom, a substituted or unsubstituted alkyl group or a substituted or unsubstituted aryl group) and a heterocyclic divalent group (e.g., a 6-chloro-1,3,5-triazine-2,4-diyl group, a pyrimidine-2,4-diyl group or a quinoxaline-2,3-diyl group).

$l_1$ represents 1 or 2.
$l_2$ represents 0 or 1.
$l_3$ represents 1, 2 or 3.

Preferably, $l_1$ represents 1, $l_2$ represents 0 or 1, and $l_3$ represents 1 or 2.

Het represents a moiety containing a saturated or unsaturated, 5- to 7-membered hetero ring having at least one nitrogen atom and optionally having a hetero atom or atoms other than the nitrogen atom (e.g., oxygen, sulfur, selenium or tellurium).

Preferably, Het has a structure represented by one of the general formulae (II) to (VI).

The substituents referred below may be further substituted by a substituent such as an alkyl group, an alkenyl group, an aryl group, a hydroxy group, a carboxyl group, a sulfo group, a nitro group, a cyano group, a halogen atom, an alkoxy group, an aryloxy group, an alkoxycarbonyl group, an acyl group, an acylamino group, a sulfonamino group, a carbamoyl group, and a sulfamoyl group.

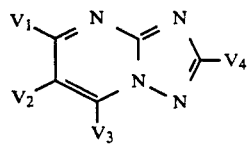

(II)

In the above general formula (II), $V_1$, $V_2$, $V_3$ and $V_4$ each represents a hydrogen atom, a substituted or unsubstituted alkyl group (e.g., methyl, ethyl, propyl, butyl, hydroxyethyl, trifluoromethyl, benzyl, sulfopropyl, diethylaminoethyl, cyanopropyl, adamantyl, p-chlorophenethyl, ethoxyethyl, ethylthioethyl, phenoxyethyl, carbamoylethyl, carboxyethyl, ethoxycarbonylmethyl or acetylaminoethyl), a substituted or unsubstituted alkenyl group (e.g., allyl or styryl), a substituted or unsubstituted aryl group (e.g., phenyl, naphthyl, p-carboxyphenyl, 3,5-dicarboxyphenyl, m-sulfophenyl, p-acetamidophenyl, 3-caprylamidophenyl, p-sulfamoylphenyl, m-hydroxyphenyl, p-nitrophenyl, 3,5-dichlorophenyl, p-anisyl, o-anisyl, p-cyanophenyl, methylureidophenyl, m-fluorophenyl, p-tolyl or m-tolyl), an optionally substituted heterocyclic residue (e.g., pyridyl, 5-methyl-2-pyridyl or thienyl), a halogen atom (e.g., chlorine, bromine or fluorine), a mercapto group, a cyano group, a carboxyl group, a sulfo group, a hydroxy group, a carbamoyl group, a sulfamoyl group, an amino group, a nitro group, an optionally substituted alkoxy group (e.g., methoxy, ethoxy, 2-methoxyethoxy or 2-phenylethoxy), an optionally substituted aryloxy group (e.g., phenoxy, p-methylphenoxy or p-chlorophenoxy), an acyl group (e.g., acetyl or benzoyl), an acylamino group (e.g., acetylamino or caproylamino), a sulfonyl group (e.g., methanesulfonyl or benzenesulfonyl), a sulfonylamino group (e.g., methanesulfonylamino or benzenesulfonylamino), a substituted amino group (e.g., diethylamino or hydroxyamino), an alkyl or arylthio group (e.g., methylthio, carboxyethylthio, sulfobutylthio or phenylthio), an alkoxycarbonyl group (e.g., methoxycarbonyl), or an aryloxycarbonyl group (e.g., phenoxycarbonyl). These substituents may further be linked to another Het through a divalent linkage group L or through a single bond.

In addition, at least one of $V_1$, $V_2$, $V_3$ and $V_4$ may be a divalent linkage group L or a single bond.

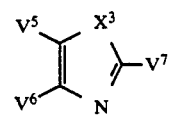

(III)

In the above general formula (III), $X^3$ represents an oxygen atom, a sulfur atom or $N-R^2$ (wherein $R^2$ represents a hydrogen atom, a substituted or unsubstituted alkyl group, a substituted or unsubstituted aryl group or a substituted or unsubstituted heterocyclic group).

$V^5$, $V^6$ and $V^7$ are the same as defined for $V^1$ to $V^4$, or represent the aforementioned divalent linkage groups L or a single bond.

$V^5$ and $V^6$ may be bound to each other to form a benzo- or naphtho-fused ring.

Those substituents which have been mentioned with $V^1$ to $V^4$ and/or a linkage group L (or a single bond) may be present on the benzo- and naphtho-fused rings and in $R^2$ when $R^2$ is other than hydrogen atom.

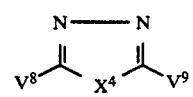

(IV)

In the above general formula (IV), $X^4$ represents an oxygen atom, a sulfur atom or N-$R^3$.

$R^3$ is the same as defined for $R^2$ in the foregoing general formula (VIII).

$V^8$ and $V^9$ are the same as defined for $V^1$ to $V^4$ in the general formula (II), or represent the aforementioned divalent linkage group L or a single bond.

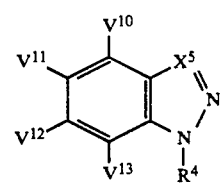

(V)

In the general formula (V), $X^5$ represents a nitrogen atom or C—$R^5$.

$R^4$ and $R^5$ are independently the same as defined for $R^2$ in the foregoing general formula (III), and $V^{10}$, $V^{11}$, $V^{12}$ and $V^{13}$ are the same as defined for $V^1$ to $V^4$ in the foregoing general formula (II).

In addition, $V^{10}$ to $V^{13}$ may be a linkage group L or a single bond.

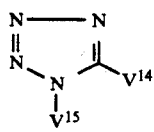
(VI)

In the above general formula (VI), $V^{14}$ and $V^{15}$ are the same as defined for $V^1$ to $V^4$ in the foregoing general formula (II).

In addition, $V^{14}$ to $V^{15}$ may be a linkage group L or a single bond.

A preferable structure of the compound represented by the general formula (Ia) is shown by the general formula (VII).

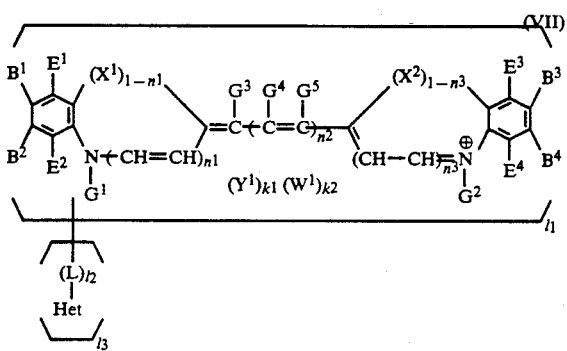

In the above general formula (VII), $X^1$ and $X^2$, which may be the same or different, each represents a sulfur atom, an oxygen atom, a selenium atom,

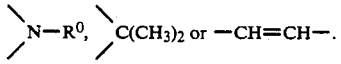

$G^1$, $G^2$ and $R^o$, which may be the same or different, each represents an alkyl group, an aryl group, an alkenyl group or a heterocyclic group. These substituents may be unsubstituted or substituted or may be a divalent linkage group L or a single bond. Preferable examples of the alkyl or alkenyl group include an alkyl or alkenyl group containing 1 to 18, more preferably 1 to 8, carbon atoms (e.g., methyl, ethyl, propyl, isopropyl, butyl, isobutyl, hexyl, octyl, dodecyl, octadecyl, allyl or 2-butenyl), a substituted alkyl or alkenyl group containing 1 to 18, more preferably 1 to 10, carbon atoms (e.g., benzyl, phenethyl, p-sulfo-2-phenethyl, 2-hydroxypropyl, 3-hydroxypropyl, 2-carboxyethyl, 3-carboxypropyl, 2-methoxyethyl, 2-(2-methoxyethoxy)ethyl, 2-sulfoethyl, 3-sulfopropyl, 3-sulfobutyl, 4-sulfobutyl, 2-(3-sulfopropoxy)ethyl, 2-hydroxy-3-sulfopropyl, 3-sulfatopropyl, 2-(pyrrolidin-2-on-1-yl)ethyl, tetrafurfuryl, 3-acetoxypropyl, ethoxycarbonylethyl, 3-cyanopropyl, 2-methanesulfonylaminoethyl, 2-carbamoylethyl, 2,2,3,3-tetrafluoropropyl, 2-ethylthioethyl or 2-chloro-2-butenyl). Preferable examples of the substituted and unsubstituted aryl groups and the substituted and unsubstituted heterocyclic groups include substituted and unsubstituted aryl groups containing up to 18, more preferably up to 10, carbon atoms (e.g., phenyl, naphthyl, tolyl, anisyl, 4-chlorophenyl, sulfophenyl, carboxyphenyl, ethoxycarbonylphenyl, 3-hydroxyphenyl and 3-chloro-p-tolyl) and substituted and unsubstituted heterocyclic group (e.g., pyridyl, 3-chloro-2-pyridyl and 6-chloro-4-methoxy-1,3,5-triazin-2-yl).

$G^3$ represents a hydrogen atom or a fluorine atom or, when $n^2$ is 1 or more, an optionally substituted lower alkyl group containing up to 8 carbon atoms or may be alkylene-linked to $G^1$ to form a 5- or 6-membered ring optionally containing an oxygen atom, a sulfur atom and/or a nitrogen atom as the ring-constituting atoms or, further, may be a divalent linkage group or a single bond.

$G^4$ and $G^5$ each represents a hydrogen atom, a fluorine atom, an optionally substituted lower alkyl group containing up to 8 carbon atoms, an optionally substituted lower alkoxy group containing up to 8 carbon atoms, an optionally substituted aryl group containing up to 10 carbon atoms or, when $n^2$ represents 2 or more, $G^3$ and the nearest $G^5$, and/or $G^4$ and another $G^4$, and/or $G^5$ and another $G^5$ are linked to each other to form a 5- or 6-membered ring optionally containing an oxygen atom, a sulfur atom and/or a nitrogen atom as a ring-constituting atom, or may represent a linkage group L or a single bond.

$n^1$ and $n^3$, which may be the same or different, each represents 0 or 1.

$n^2$ represents 0, 1, 2, 3 or 4, preferably 0, 1, 2 or 3.

$Y^1$ represents a cationic group, $W^1$ represents an anionic group, and $k^1$ and $k^2$ each represents 0 or 1 as necessary to form a salt depending upon the valence of the ionic group.

Examples of the cationic group include an alkali metal cation (e.g., $Na^{\oplus}$ or $K^{\oplus}$) and a quaternary ammonium salt (e.g., triethylammonium or pyridinium).

Examples of the anionic group include a halide anion (e.g., chloride or iodide), a sulfonate anion (e.g., methanesulfonate or p-toluenesulfonate), a sulfate anion (e.g., methylsulfate), a borate anion (e.g., tetrafluoroborate), and a phosphate anion (e.g., hexafluorophosphate).

L, Het, $l_1$, $l_2$ and $l_3$ are the same as defined for L, Het, $l_1$, $l_2$ and $l_3$ in the general formula (Ia).

$B^1$, $B^2$, $B^3$, $B^4$, $E^1$, $E^2$, $E^3$ and $E^4$ each represents a hydrogen atom, a halogen atom (e.g., chlorine, fluorine or bromine), a hydroxy group, a cyano group, a trifluoromethyl group, a nitro group, a methylenedioxy group, a carboxyl group, a sulfo group, a substituted or unsubstituted alkyl group containing up to 10 carbon atoms, a substituted or unsubstituted aryl group containing up to 10 carbon atoms, a substituted or unsubstituted alkoxy group containing up to 10 carbon atoms, an alkylthio group containing up to 8 carbon atoms, an arylthio group containing up to 8 carbon atoms, an acylamino group containing up to 8 carbon atoms, an alkoxycarbonyl group containing up to 8 carbon atoms or an acyl group containing up to 10 carbon atoms, or represents a divalent linkage group L or a single bond.

In the present invention, compounds represented by the general formula (VII) are compounds wherein at least one of $B^1$, $B^2$, $B^3$, $B^4$, $E^1$, $E^2$, $E^3$, $E^4$, $G^1$, $G^2$, $G^3$, $G^4$ and $R^o$ is chemically bound to at least one of $V^1$ to $V^{15}$ and $R^1$ to $R^5$ of the compounds represented by the general formulae (II) to (VI) through a divalent linkage group, L, or a single bond. As the linking position, $G^1$, $G^2$, $R^o$, $B^1$, $B^2$, $B^3$ or $B^4$ is preferable on the methine dye moiety side.

A more preferable structure of the methine dye moiety in the methine dye of the general formula (VII) is shown by the following general formula (VIII):

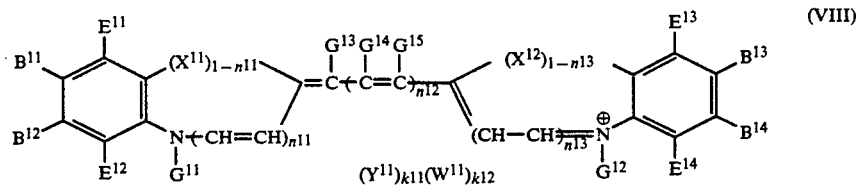

In the above formula (VIII), $X^{11}$ and $X^{12}$, which may be the same or different, each represents a sulfur atom, an oxygen atom, a selenium atom,

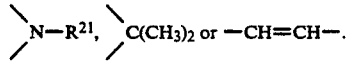

$G^{11}$, $G^{12}$ and $R^{21}$ are the same as defined for $G^1$ and $G^2$ in the general formula (VII), with the proviso that at least one of $G^{11}$ and $G^{12}$ has $$\text{---}(\text{---}L_1\text{---})_{n_{13}}\text{---}Het_1]_{l_3}$$

as a substituent.

$G^{13}$ is the same as defined for $G^3$ in the general formula (VII), and $G^{14}$ and $G^{15}$ are the same as defined for $G^4$ and $G^5$ in the general formula (VII).

$B^{11}$, $B^{12}$, $B^{13}$, $B^{14}$, $E^{11}$, $E^{12}$, $E^{13}$ and $E^{14}$ are the same as defined for $B^1$, $B^2$, $B^3$, $B^4$, $E^1$, $E^2$, $E^3$ and $E^4$ in the general formula (VII), respectively, with the proviso that $G^{13}$, $G^{14}$, $G^{15}$, $B^{11}$, $B^{12}$, $B^{13}$, $B^{14}$, $E^{11}$, $E^{12}$, $E^{13}$ and $E^{14}$ do not contain a divalent linkage group L or a single bond.

$n^{11}$, $n^{12}$, $n^{13}$, $k^{11}$, $k^{12}$, $Y^{11}$ and $W^{11}$ are the same as defined for $n^1$, $n^2$, $n^3$, $k^1$, $k^2$, $Y^1$ and $W^1$ in the general formula (VII), respectively.

$L_1$ and $Het_1$ are the same as defined for L and Het in the general formula (VII), respectively.

$l_{12}$ represent 0 or 1.

$l_3$ represent 1, 2 or 3.

Specific examples of the methine compounds and methine dyes represented by the general formula (Ia) are illustrated below.

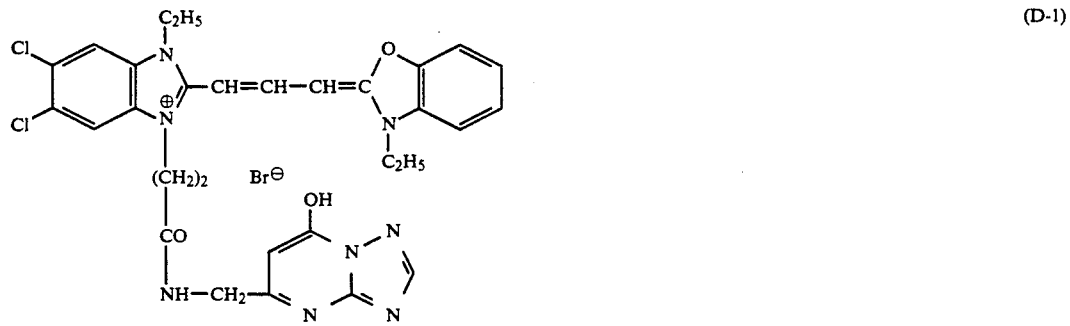

(D-1)

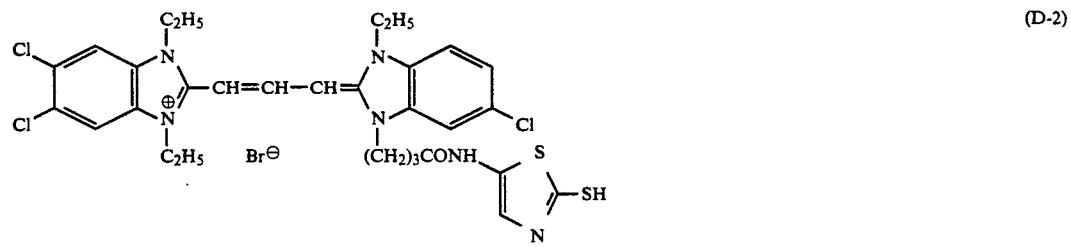

(D-2)

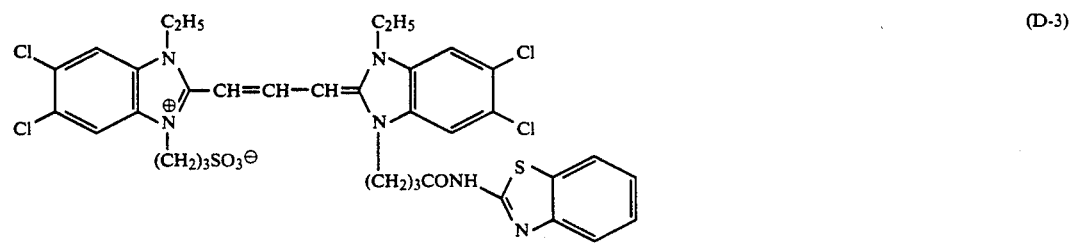

(D-3)

-continued
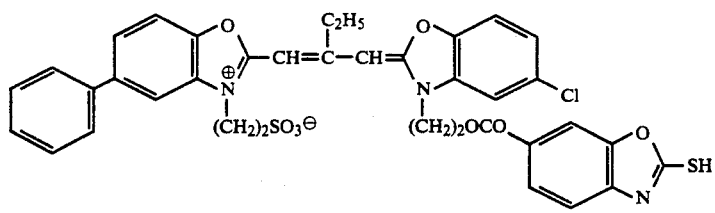
(D-4)
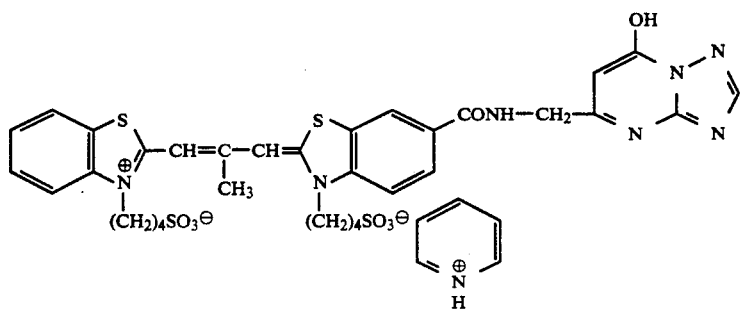
(D-5)
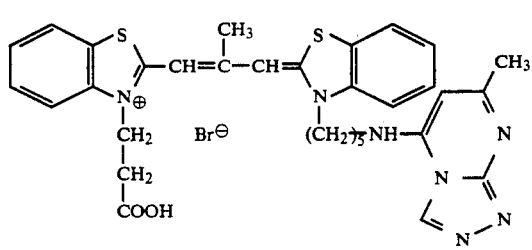
(D-6)
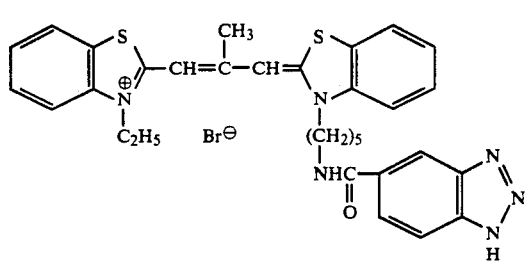
(D-7)
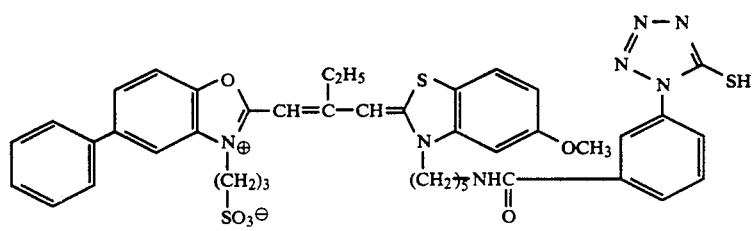
(D-8)
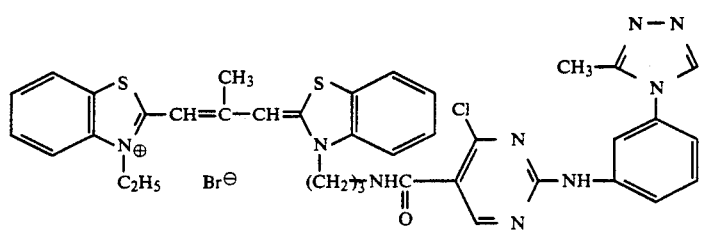
(D-9)

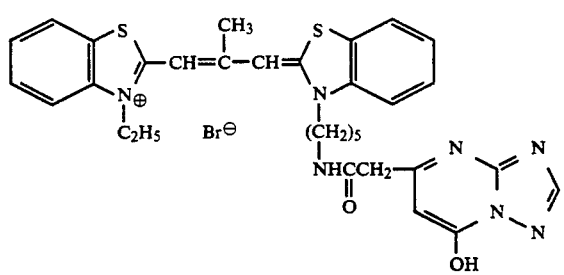
(D-10)
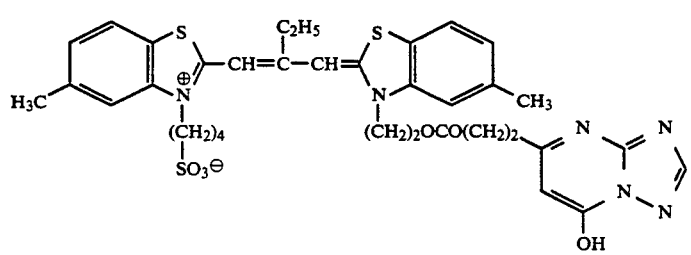
(D-11)
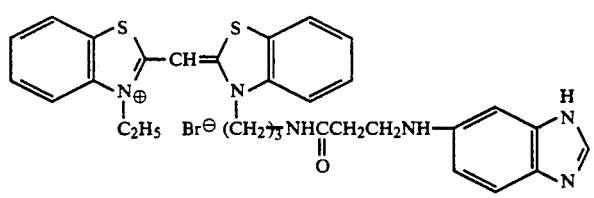
(D-12)
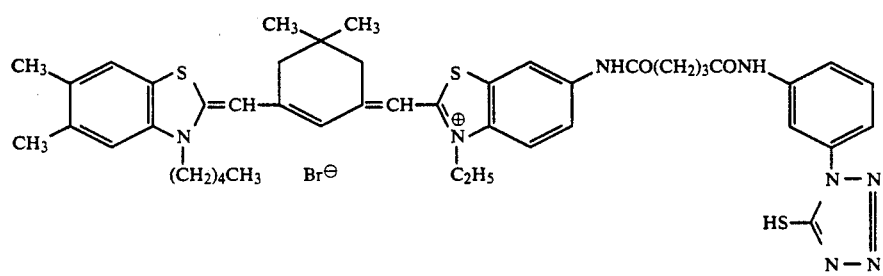
(D-13)
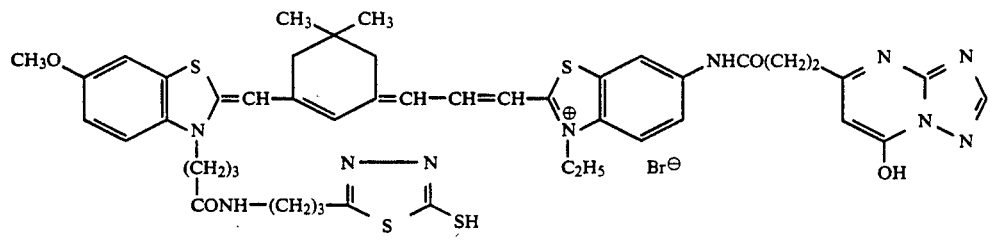
(D-14)
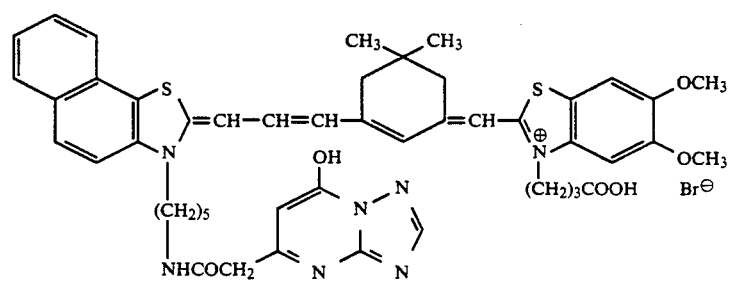
(D-15)

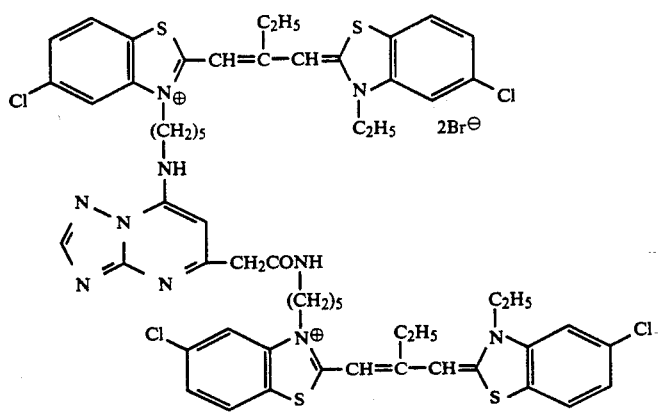
(D-16)
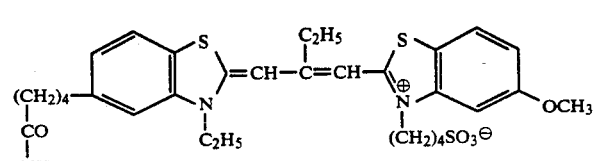
(D-17)
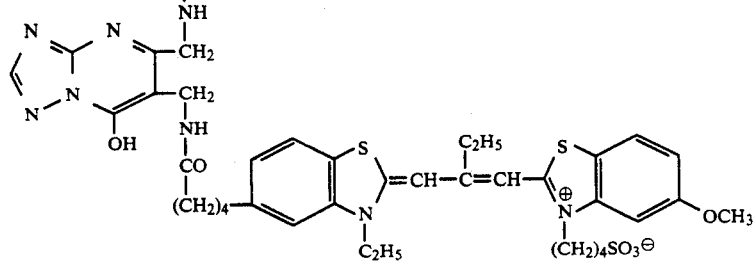
(D-18)
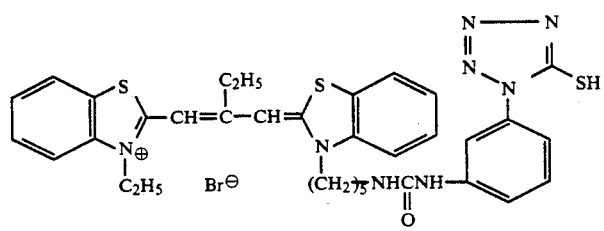
(D-19)
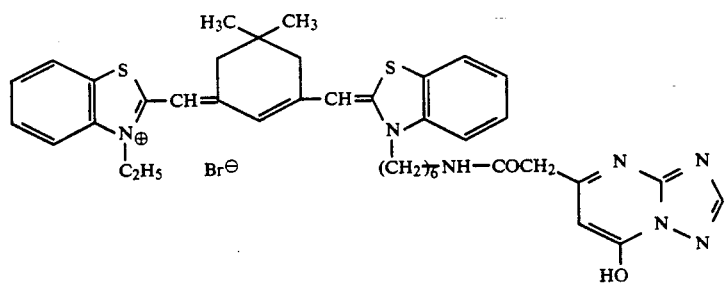
(D-20)
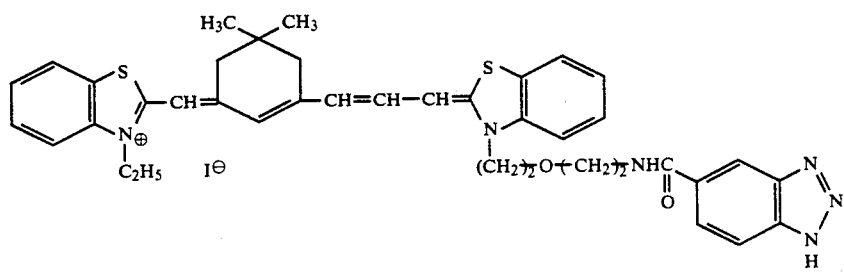

-continued
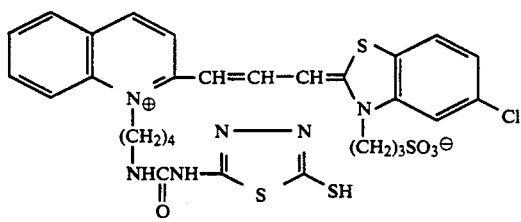
(D-21)
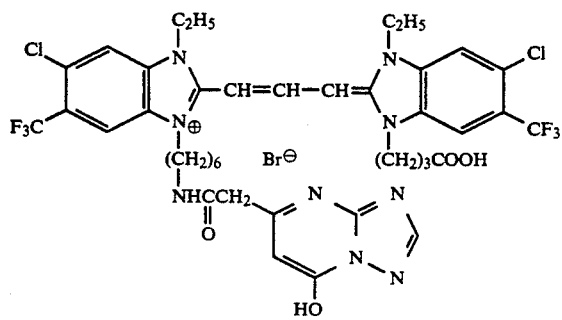
(D-22)
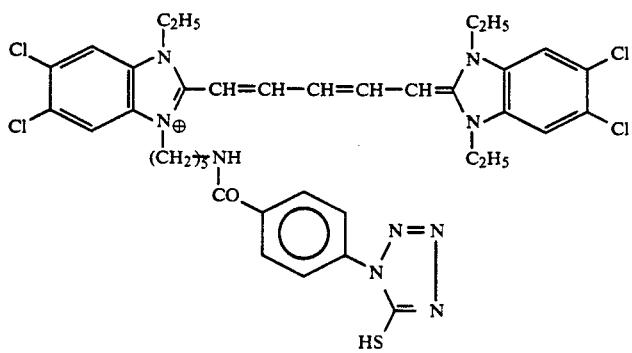
(D-23)
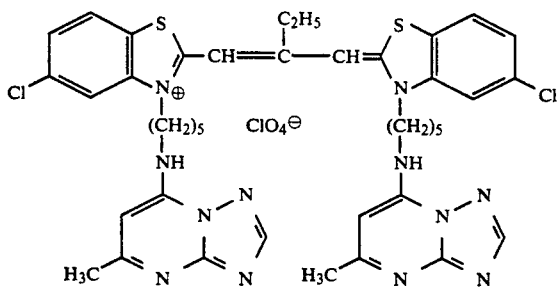
(D-24)
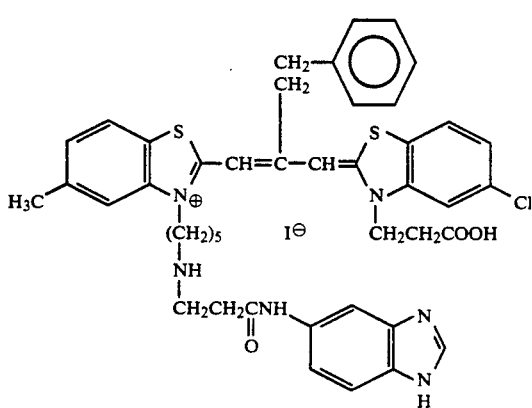
(D-25)

-continued
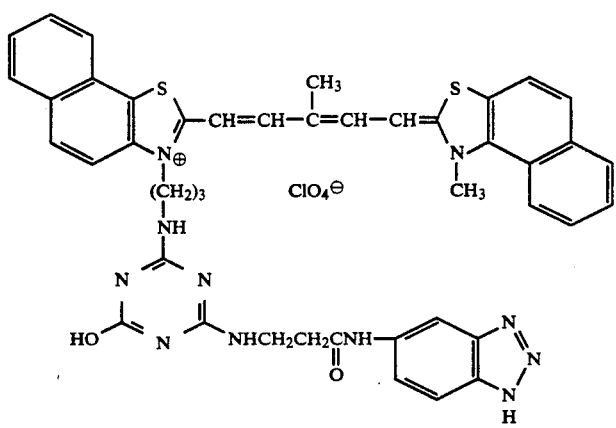
(D-26)
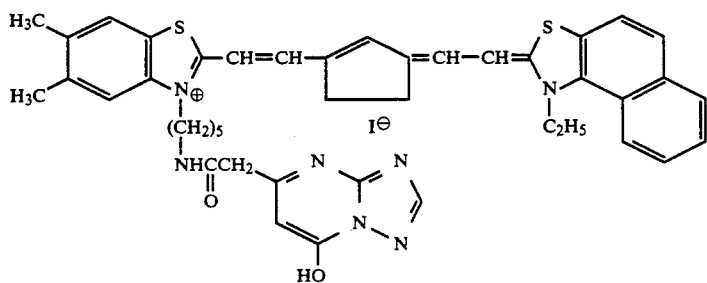
(D-27)
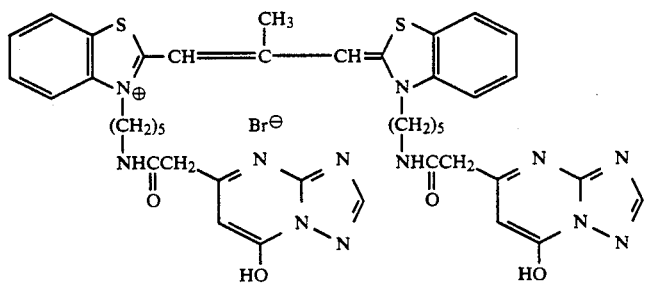
(D-28)
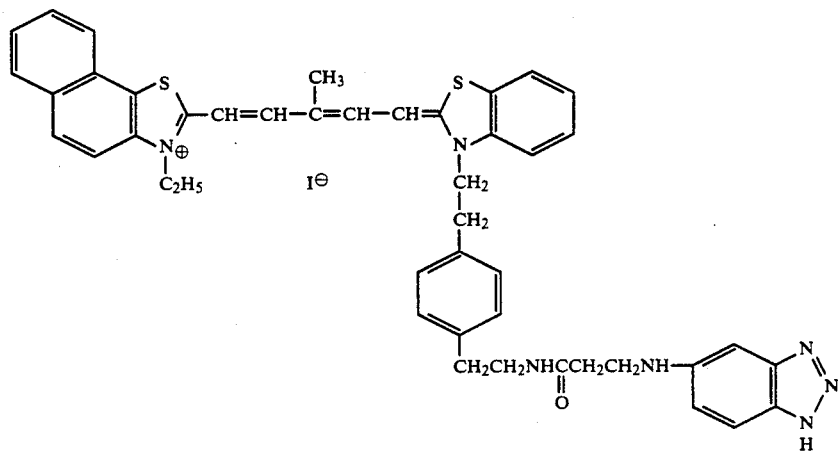
(D-29)

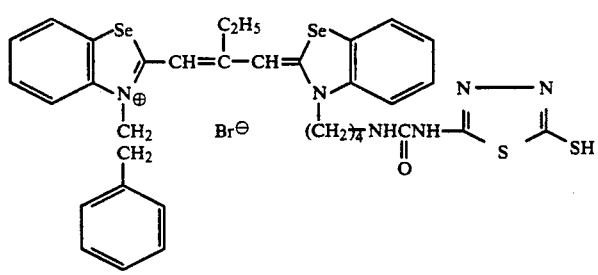
(D-30)
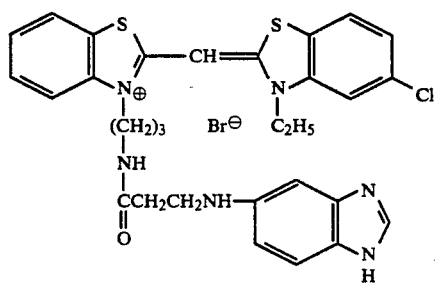
(D-31)
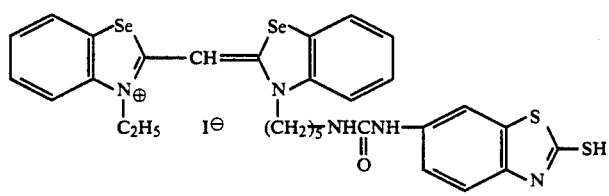
(D-32)
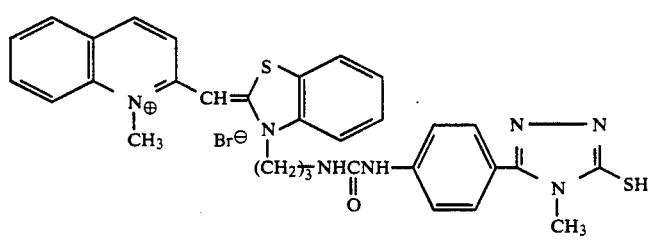
(D-33)
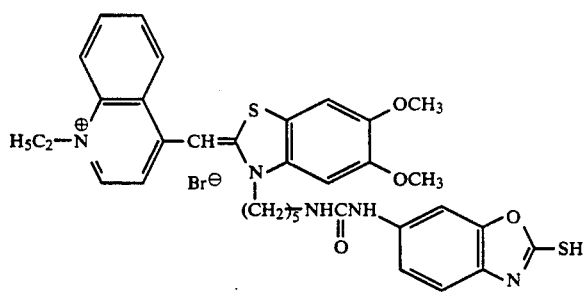
(D-34)
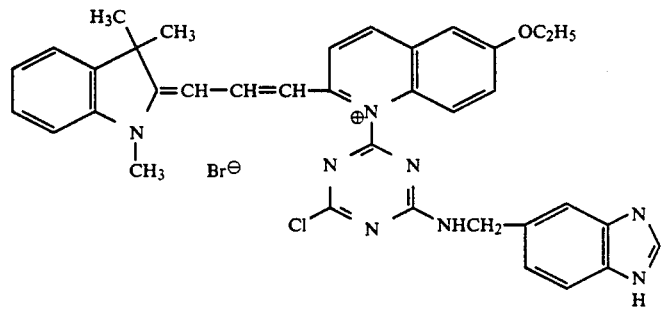
(D-35)

-continued
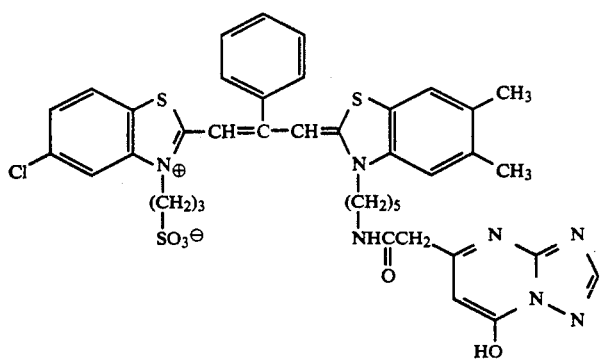
(D-36)
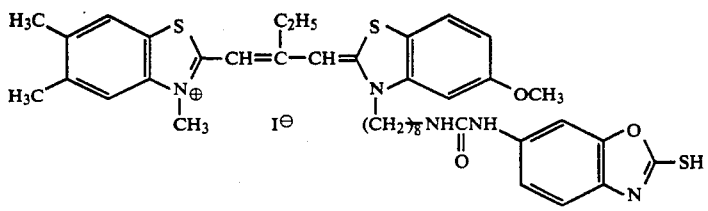
(D-37)
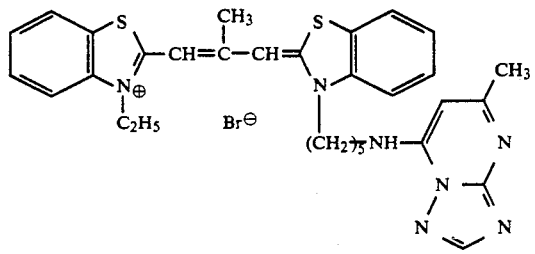
(D-38)
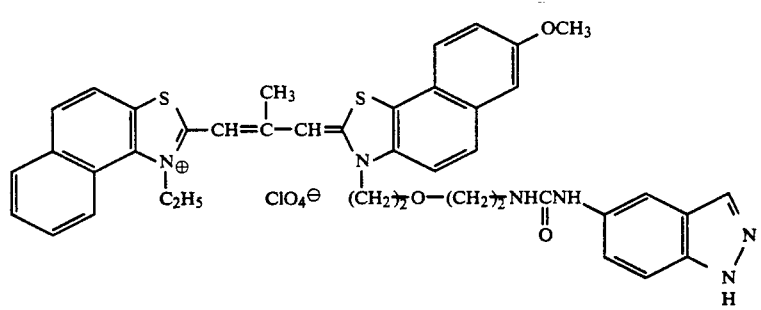
(D-39)
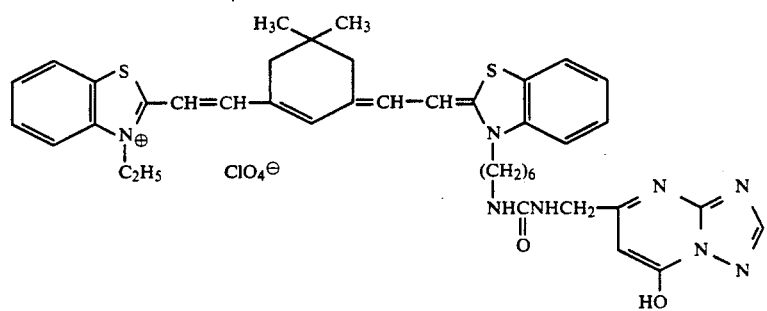
(D-40)

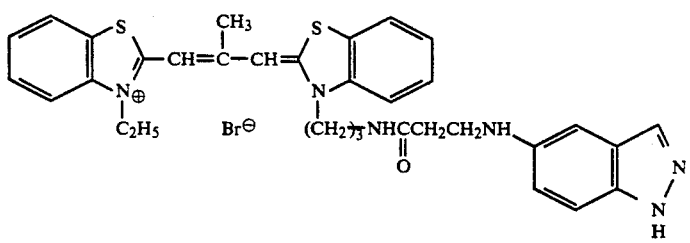 (D-41)
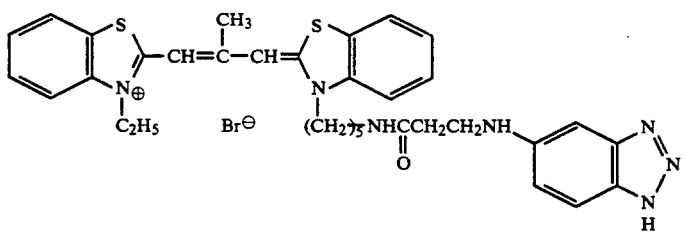 (D-42)
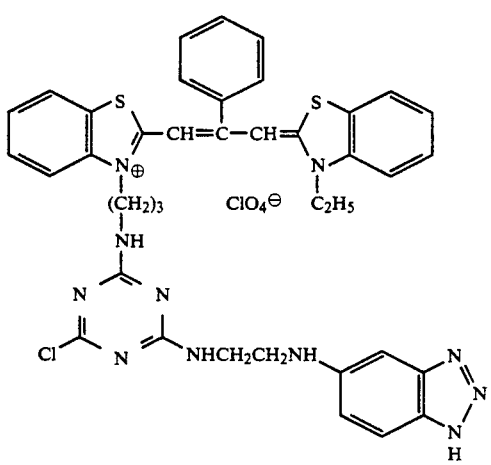 (D-43)
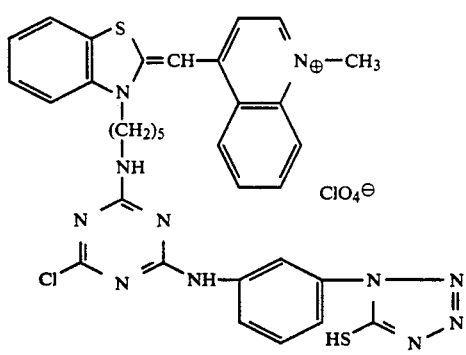 (D-44)
Particularly preferable examples of the methine compounds and methine dyes represented by the general formula (Ia) are D-7, D-10, D-18, D-38, D-41, D-12, and D-43.
Of the chromogens represented by MER, those represented by the following general formula (MER-a) are preferable.
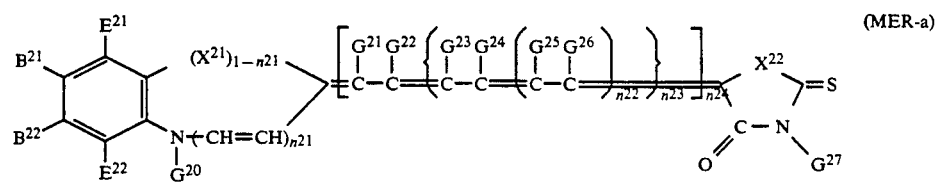 (MER-a)

In the above general formula (MERa), $n^{21}$, $n^{22}$, $n^{23}$ and $n^{24}$ each independently represents 0 or 1, $X^{21}$ represents a sulfur atom, an oxygen atom, a selenium atom,

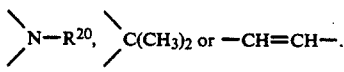

$G^{20}$, $G^{27}$ and $R^{20}$, which may be the same or different, each represents an alkyl group, an aryl group, an alkenyl group or a heterocyclic group. These substituents may be unsubstituted or substituted or may be a divalent linkage group L or a single bond. Preferable examples of the alkyl or alkenyl group include an alkyl or alkenyl group containing 1 to 18, more preferably 1 to 8, carbon atoms (e.g., methyl, ethyl, propyl, isopropyl, butyl, isobutyl, hexyl, octyl, dodecyl, octadecyl, allyl or 2-butenyl), a substituted alkyl or alkenyl group containing 1 to 18, more preferably 1 to 8, carbon atoms (e.g., benzyl, phenethyl, p-sulfo-2-phenethyl, 2-hydroxypropyl, 3-hydroxypropyl, 2-carboxyethyl, 3-carboxypropyl, 2-methoxyethyl, 2-(2-methoxyethoxy)ethyl, 2-sulfoethyl, 3-sulfopropyl, 3-sulfobutyl, 4-sulfobutyl, 2-(3-sulfopropoxy)ethyl, 2-hydroxy-3-sulfopropyl, 3-sulfatopropyl, 2-(pyrrolidin-2-on-1-yl)ethyl, tetrafurfuryl, 3-acetoxypropyl, ethoxycarbonylethyl, 3-cyanopropyl, methanesulfonylaminoethyl, 2-carbamoylethyl, 2,2,3,3-tetrafluoropropyl, 2-ethylthioethyl or 2-chloro-2-butenyl). Preferable examples of the substituted and unsubstituted aryl groups and the substituted and unsubstituted heterocyclic groups include substituted and unsubstituted aryl group containing up to 18, more preferably up to 10, carbon atoms (e.g., phenyl, naphthyl, tolyl, anisyl, 4-chlorophenyl, sulfophenyl, carboxyphenyl, ethoxycarbonylphenyl, 3-hydroxyphenyl and 3-chloro-p-tolyl) and substituted and unsubstituted heterocyclic groups (e.g., pyridyl, 3-chloro-2-pyridyl and 6-chloro-4-methoxy-1,3,5-triazin-2-yl).

$G^{21}$ represents a hydrogen atom or a fluorine atom or, when $n^{24}$ is 1 or more, an optionally substituted lower alkyl group containing up to 8 carbon atoms or may be alkylene-linked to $G^{20}$ to form a 5- or 6-membered ring optionally containing an oxygen atom, a sulfur atom and/or a nitrogen atom as the ring-constituting atoms or, further, may be a divalent linkage group L or a single bond.

$G^{22}$ to $G^{26}$ each represents a hydrogen atom, a fluorine atom, an optionally substituted lower alkyl group containing up to 8 carbon atoms, an optionally substituted lower alkoxy group containing up to 8 carbon atoms, an optionally substituted aryl group containing up to 10 carbon atoms, or $G^{20}$ and $G^{21}$, $G^{21}$ and $G^{23}$, $G^{22}$ and $G^{24}$, $G^{23}$ and $G^{25}$, or $G^{24}$ and $G^{26}$, may be linked to each other to form a 5- or 6-membered ring.

$X^{22}$ represents an oxygen atom, a sulfur atom or $>N-R^{24}$.

$R^{24}$ and $G^{27}$ each represents a group selected from those which have been mentioned as $G^{20}$, or may be a linkage group L or a single bond.

$B^{21}$, $B^{22}$, $E^{21}$ and $E^{22}$ each represents a hydrogen atom, a halogen atom (e.g., chlorine, fluorine or bromine), a hydroxy group, a cyano group, a trifluoromethyl group, a nitro group, a methylenedioxy group, a carboxyl group, a sulfo group, a substituted or unsubstituted alkyl group containing up to 10 carbon atoms, a substituted or unsubstituted aryl group containing up to 10 carbon atoms, a substituted or unsubstituted alkoxy group containing up to 10 carbon atoms, an alkylthio group containing up to 8 carbon atoms, an arylthio group containing up to 8 carbon atoms, an acylamino group containing up to 8 carbon atoms, an alkoxycarbonyl group containing up to 8 carbon atoms or an acyl group containing up to 10 carbon atoms, or represents a divalent linkage group L or a single bond.

In the present invention, preferably examples of the compounds represented by the general formula (Ib) are compounds wherein at least one of $B^{21}$, $B^{22}$, $E^{21}$, $E^{22}$, $G^{20}$, $G^{21}$, $G^{22}$, $G^{23}$, $G^{24}$, $G^{25}$, $G^{26}$, $G^{27}$ and $R^{20}$ is Chemically bound to at least one of $V^1$ to $V^{15}$ and $R^1$ to $R^5$ of the compounds represented by the general formulae (II) to (VI) through a divalent linkage group L or a single bond. As the linking position, $G^{20}$, $G^{21}$, $G^{22}$, $G^{23}$, $G^{24}$, $G^{25}$, $G^{26}$, $G^{27}$, $R^{20}$, $B^{21}$ or $B^{22}$ is preferable on the merocyaninethine dye moiety side, with $G^{20}$ and $G^{27}$ being particularly preferred.

Specific examples of the methine compounds and methine dyes of the present invention represented by the general formula (Ib) are illustrated below.

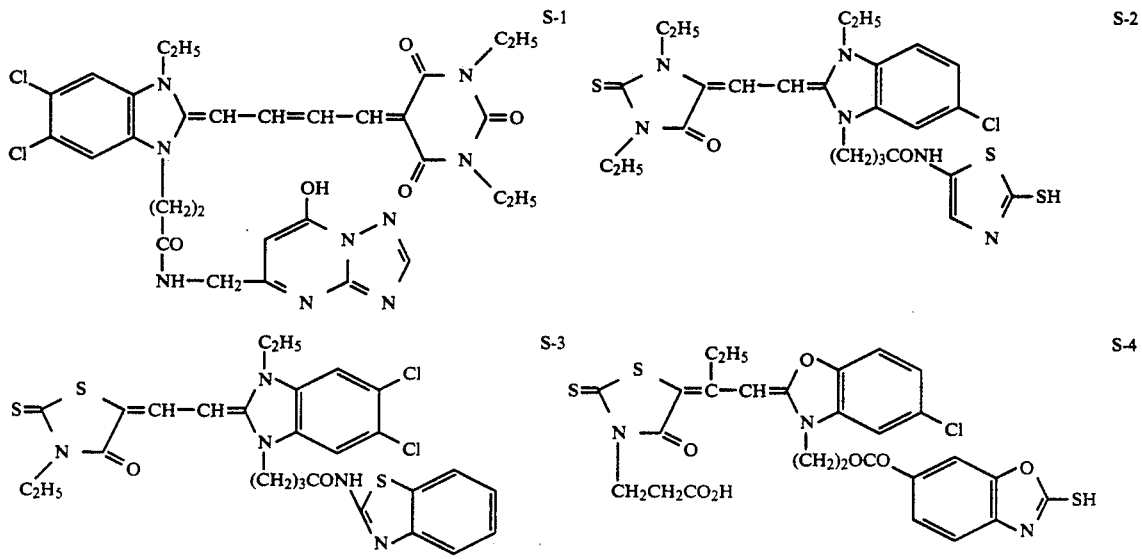

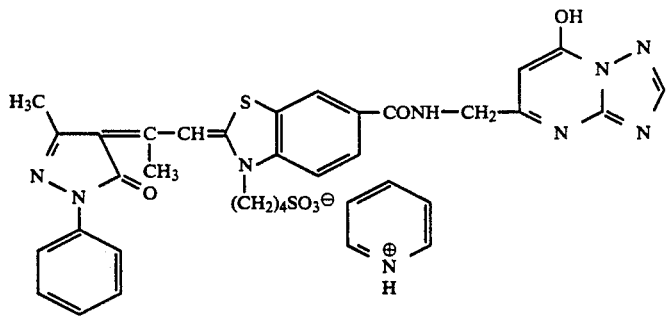
S-5
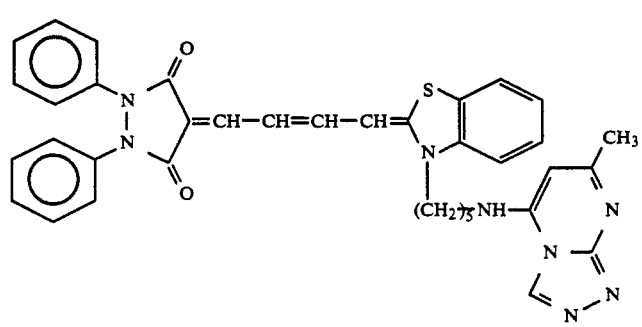
S-6
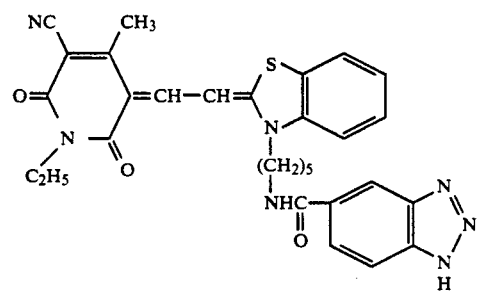
S-7
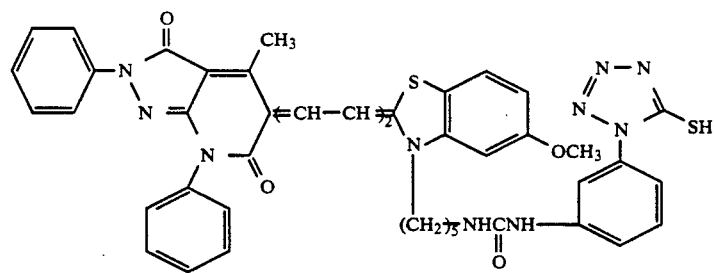
S-8
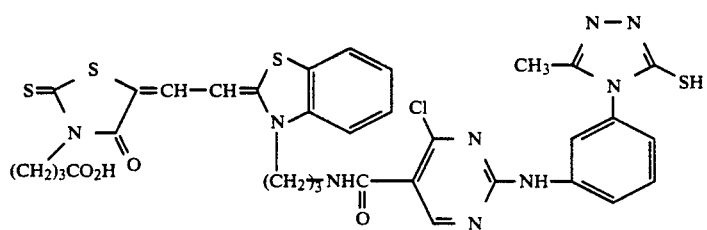
S-9

-continued
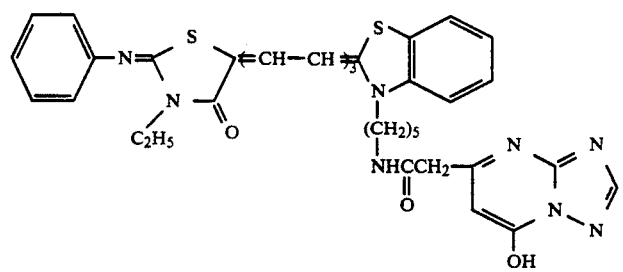
S-10
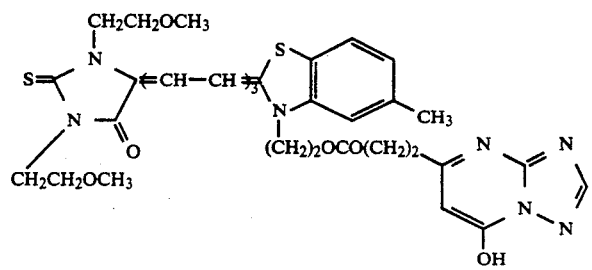
S-11
S-12
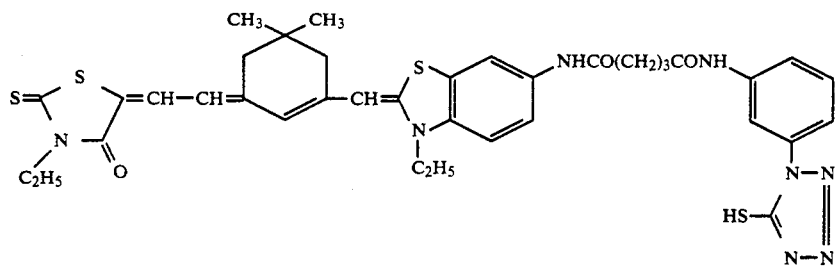
S-13
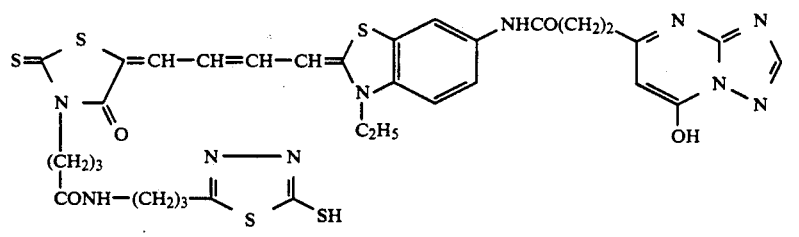
S-14
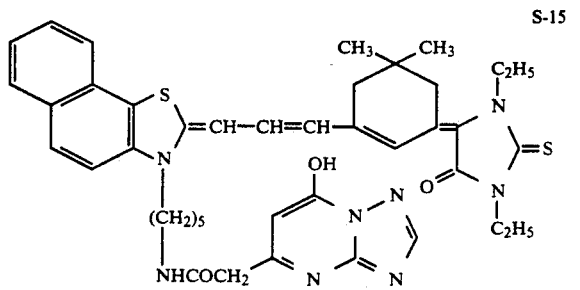
S-15
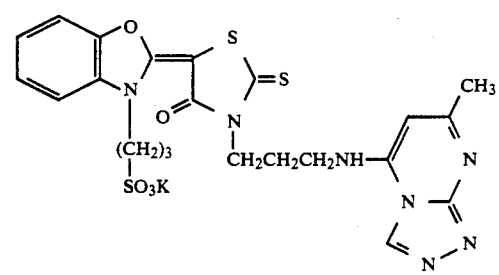
S-16

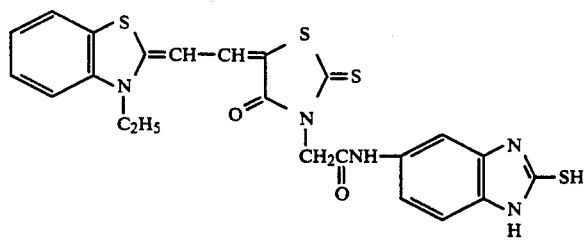
S-17
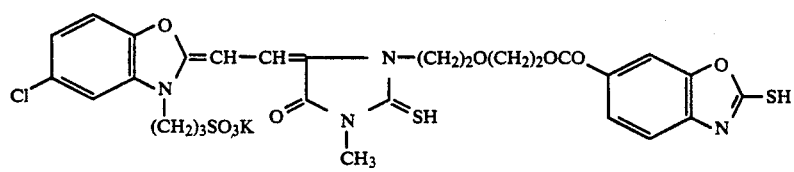
S-18
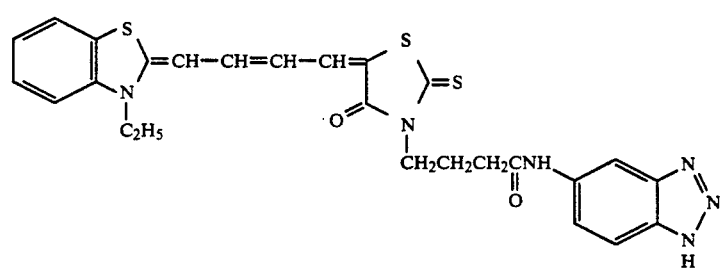
S-19
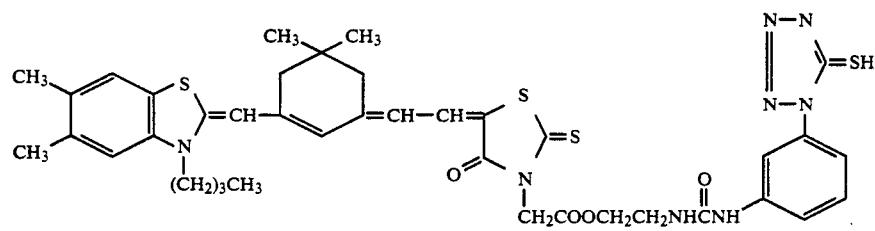
S-20
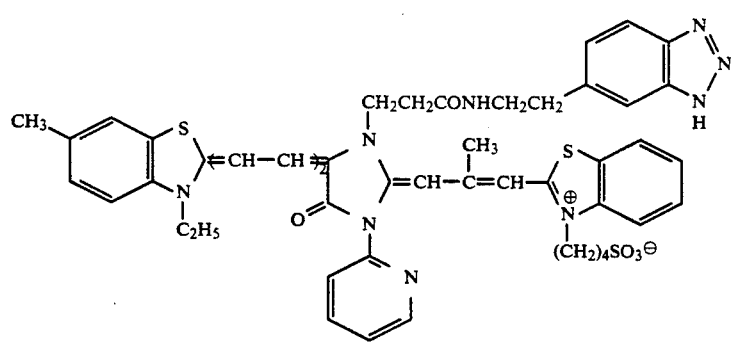
S-21
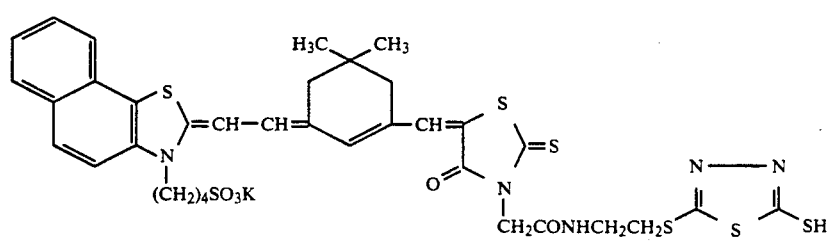
S-22

-continued
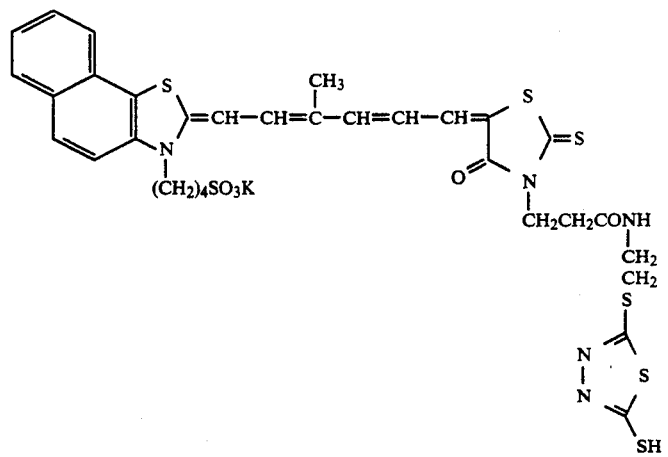
S-23
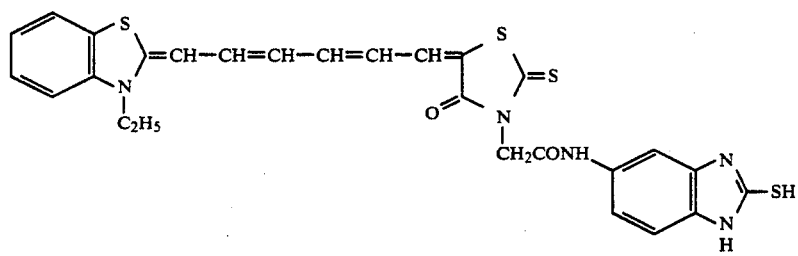
S-24
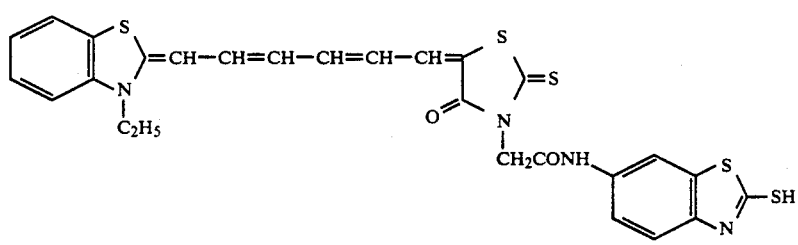
S-25
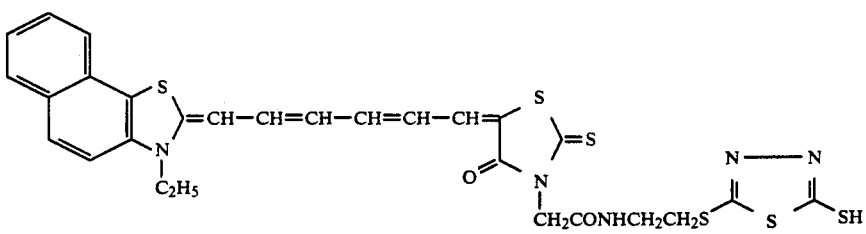
S-26
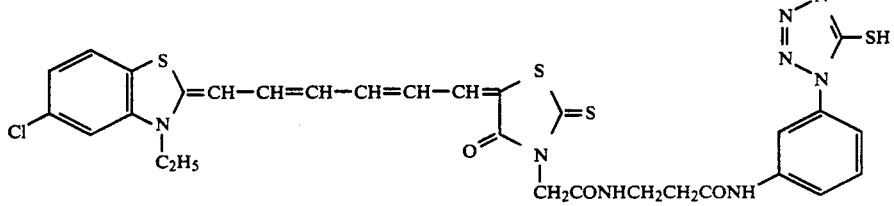
S-27
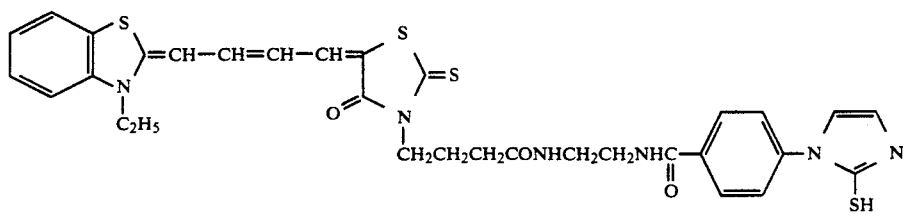
S-28

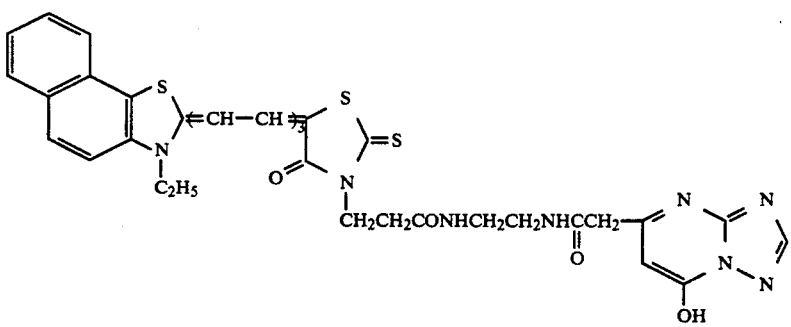
S-29
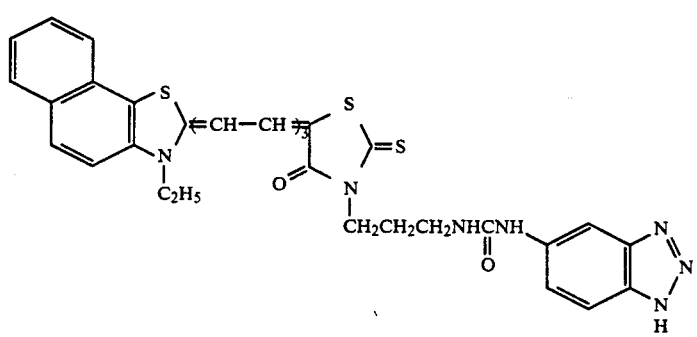
S-30
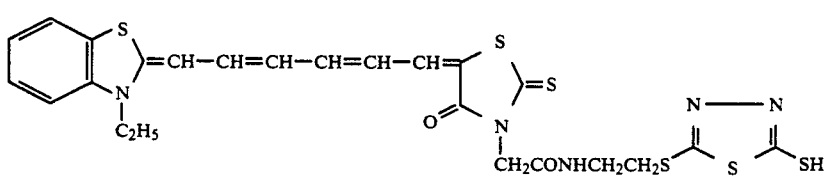
S-31
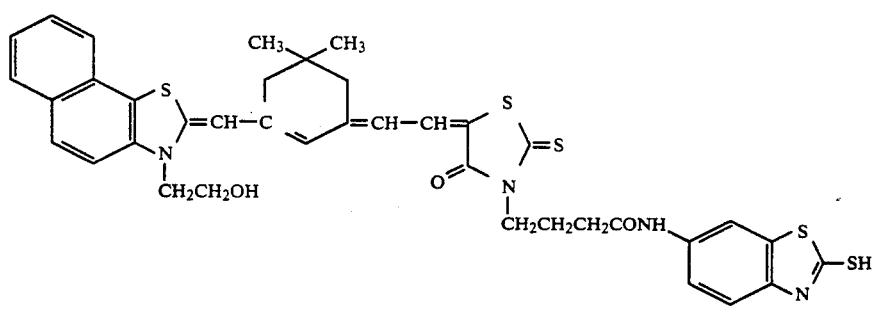
S-32
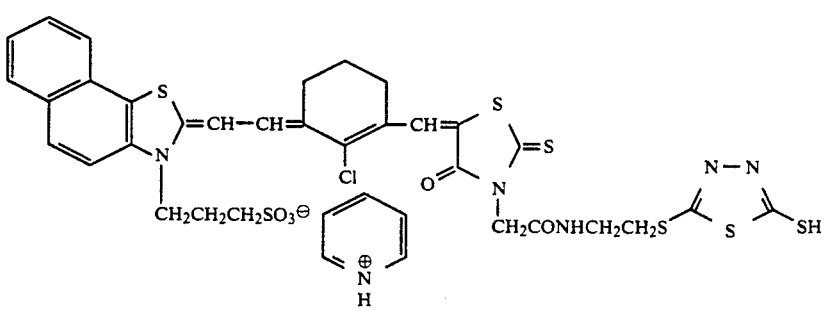
S-33

-continued

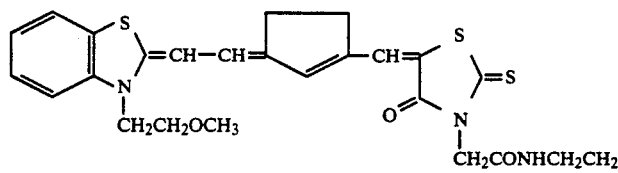
S-34

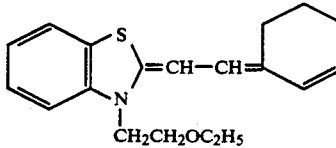
S-35

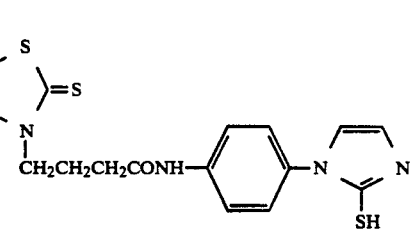

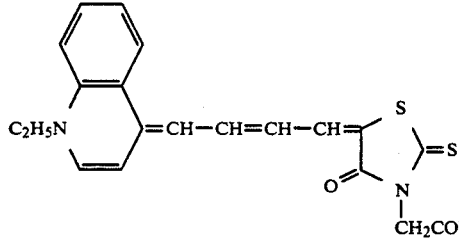
S-36

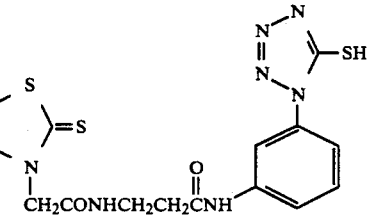

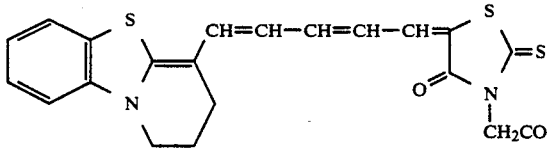
S-37

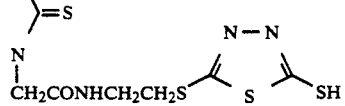

Particularly preferable examples of the methine compounds and methine dyes represented by the general formula (Ib) are S-17, S-24, S-25, and S-31.

The novel methine compounds of the present invention may be synthesized according to any of a process of connecting the sensitizing dye moiety and the nitrogen-containing heterocyclic moiety represented by Het to each other, a process of connecting a starting material or an intermediate for the sensitizing dye and the nitrogen-containing heterocyclic moiety represented by Het to each other, followed by converting the starting material or intermediate to the dye, and a process of connecting a starting material or an intermediate for the nitrogen-containing heterocyclic moiety represented by Het and the sensitizing dye to each other, followed by synthesizing the nitrogen-containing heterocyclic moiety represented by Het, utilizing various bond-forming reactions well known in the field of organic chemistry such as an amido bond-forming reaction and an ester bond-forming reaction. A proper process may be selected. As to the reactions for forming these bonds, reference may be made to many books relating to organic synthesis reactions, such as The Japanese Chemical Society; Shin Jikken-kagaku Koza, 14, *Yuki Kagobutsu no Gosei to Hanno (Synthesis and reaction of organic Compounds*, vol. I to V (Maruzen, Tokyo, 1977), Yoshiro Ogata *Yukinanno-ron (Theory on Organic Reactions* (Maruzen, Tokyo, 1962), and L. F. Fieser and M. Fieser; *Organic Chemistry* (Maruzen, Tokyo, 1962).

The novel methine compounds and the methine dyes of the present invention are superior in adsorption of a heavy metal or heavy metal ion. They are effective as sensitizing dyes and dyes for photographic light-sensitive materials (for example, silver halide photography or electrophotography), and as sensitizing dyes and dyes for other organic light-sensitive materials. Further, they are effective as dyes for laser recording materials, dyes for filters, dyes for medicines or agro chemicals, and dyes for dyeing pulp or cells.

The present invention is now illustrated in greater detail by reference to the following examples which, however, are not to be construed as limiting the present invention in any way.

Example 1 (Synthesis of Dye D-7)

190 mg of 3-(5-aminopentyl)-3'-ethyl-9-methyl-thiacarbocyanine bromide hydrobromide and 0.15 ml of triethylamine were added to 60 ml of acetonitrile, and the resulting mixture was stirred at room temperature. After 10 minutes, 160 mg of 5-phenoxycarbonylbenzotriazole was added thereto, and the reaction was conducted for 3 hours at room temperature, then for 8 hours at 60° C. Purification of the reaction mixture by silica gel column chromatography (eluting solution: methanol/chloroform = $\frac{1}{4}$ vol/vol) yielded 19 mg of the aimed dye.

Dark reddish violet crystals (m.p. 155 to 161° C.)
$\lambda^{methanol}_{max}$: 544 nm FAB-MS (posi) m/e=581 (M-Br)+

Example 2 (Synthesis of Dye D-10)

200 mg of 3-(5-aminopentyl)-3'-ethyl-9-methylthiacarbocyanine bromide hydrobromide and 0.15 ml of triethylamine were added to a mixture solvent of 100 ml of acetonitrile and 50 ml of chloroform, and the resulting mixture was stirred at room temperature. After 10 minutes, 200 mg of 6-(4-chlorophenoxycarbonylmethyl)-1,3,3a,7-tetraazaindene was added thereto, and the reaction was conducted for 1 hour at room temperature, then for 10 hours at 60° C. Purification of the reaction mixture by silica gel column chromatography (eluting solution: methanol/chloroform=⅓ vol/vol) yielded 153 mg of the aimed dye.

Dark reddish violet crystals (m.p. 148 to 155° C.)
$\lambda^{methanol}_{max}$: 546 nm
FAB-MS (posi) m/e=612 (M-Br)+

Example 3 (Synthesis of Dye D-18)

200 mg of 3-(5-aminopentyl)-3',9-diethylthiacarbocyanine bromide hydrobromide and 0.10 ml of triethylamine were added to a mixture solvent of 50 ml of acetonitrile and 50 ml of chloroform, and the resulting mixture was stirred at room temperature. After 10 minutes, 160 mg of 1-(3-phenoxycarbonylaminophenyl)-5-mercaptotetrazole was added thereto, and the reaction was conducted for 8 hours at 60° C. After cooling the reaction solution to room temperature, the formed crystals were collected by filtration, and washed with methanol to obtain 50 mg of the end dye.

Dark reddish violet crystals (m.p. 160 to 175° C.)
$\lambda^{methanol}_{max}$: 544 nm
FAB-MS (posi) m/e=669 (M-Br)+

Example 4 (Synthesis of Dye D-38)

200 mg of 3-(5-aminopentyl)-3'-ethyl-9-methylthiacarbocyanine bromide hydrobromide and 0.15 ml of triethylamine were added to 50 ml of methanol, and the resulting mixture was stirred at room temperature. After 5 minutes, 100 mg of 4-chloro-6-methyl-1,3,3a,7-tetraazaindene was added thereto, and the reaction was conducted for 2 hours at room temperature, successively for 4 hours at 60° C. Purification of the reaction mixture by silica gel column chromatography (eluting solution: methanol/chloroform=⅓ vol/vol) yielded 80 mg of the aimed dye.

Dark reddish violet crystals (m.p. 133° to 140° C.)
$\lambda^{methanol}_{max}$: 544 nm
FAB-MS (posi) m/e=568 (M-Br)+

Example 5 (Synthesis of Dye D-41)

150 mg of 3-[3-(vinylcarbonylamino)propyl]-3'-ethyl-9-methylthiacarbocyanine bromide and 150 mg of 5-amino-1H-indazole were added to 100 ml of methanol, and the reaction was conducted for 2 hours at room temperature, then for 6 hours under reflux of methanol. Purification of the reaction mixture by silica gel column chromatography (eluting solution: methanol/chloroform =3/7 vol/vol) yielded 25 mg of the aimed dye.

Dark red crystals
$\lambda^{methanol}_{max}$: 545 nm
FAB-MS (posi) m/e=595 (M-Br)+

Example 6 (Synthesis of Dye D-12)

The same procedure as in Example 5 was conducted using 120 mg of 3-[3-(vinylcarbonylamino)propyl]-3'-ethythiamonomethynecyanine bromide and 100 mg of 5-aminoimidazole to obtain 27 mg of the end dye.

Yellow crystals
$\lambda^{methanol}_{max}$: 424 nm
FAB-MS (posi) m/e=555 (M-Br)+

Example 7 (Synthesis of Dye D-43)

150 mg of 3-[3-(4,6-dichloro-1,3,5-triazin)-1-ylamino)propyl]-3'-ethyl-9-phenylthiacarbocyanine bromide, 80 mg of 5-(2-aminoethylamino)benzotriazole and 0.1 ml of triethylamine were added to a mixed solvent of 20 ml of acetonitrile and 20 ml of chloroform. Reaction of the mixture was conducted for 6 hours at room temperature, then 4 hours at 40° C.

After purification of the reaction mixture by silica gel column chromatography (eluting solution: methanol/chloroform=3/7 vol/vol), the purified product was subjected to salt exchange reaction with sodium perchlorate to obtain 45 mg of the end dye.

Dark red crystals
$\lambda^{methanol}_{max}$: 559 nm

Example 8 (Dyeing of filter paper)

An M/500 solution of Compound D-7 of the present invention in methanol was dropped onto Toyo filter paper (No. 131), followed by air-drying. Thus, the filter paper was well dyed reddish violet.

Example 9

Dyeing of Toyo filter paper was conducted in the same manner as in Example 1 using Compounds D-10, D-12, D-15, D-18, D-38, D-41 and D-43. In every case, the filter paper was well dyed.

Example 10

A piece of white cotton cloth was dipped for 20 minutes in an M/500 solution of Compound D-10 of the present invention in methanol, then taken out and air-dried. Thus, the cotton cloth was dyed reddish violet.

Example 11 (Synthesis of Dye S-17)

Synthesis of 3-[N-(2-mercaptobenzimidazol-5-yl)-carbamoyl]-rhodanine 1.15 g of 3-carboxymethylrhodanine and 1 g of 5-amino-2-mercaptobenzimidazole were dissolved in 25 ml of tetrahydrofuran. Thereafter, a solution of 1.2 g of dicyclohexylcarbodiimide in 5 ml of tetrahydrofuran was added thereto. After stirring the mixture for 5 hours at room temperature, a precipitate formed was collected by filtration to obtain 2 g of milky white powder. 20 ml of N,N-dimethylformamide was added to this powder, and the resulting mixture was stirred, followed by removing insolubles by filtration. 200 ml of water was added to the filtrate, and the precipitate formed was collected by filtration, then dried to obtain 1.1 g of 3-{N-(2-mercaptobenzimidazol-5-yl)carbamoyl}-rhodanine as milky white powder.

(2) Synthesis of Dye S-17

250 ml of methanol and 1 ml of triethylamine were added to 1 g of the rhodanine compound obtained in (1) and 1.3 g of 2-{2 (N-acetyl-N-phenylamino)vinyl}-3-ethylbenzothiazolium iodide, and the resulting mixture was refluxed for 2 hours and 20 minutes. After cooling the reaction solution, the precipitate formed was collected by filtration and washed with methanol to obtain 1.6 g of a crude dye. 10 ml of N,N-dimethylformamide was added to this crude dye, and the mixture was stirred, followed by removing insolubles by filtration.

90 ml of methanol was added to the filtrate, and the precipitate formed was collected by filtration and washed with methanol. The thus-obtained dye was again dissolved in N,N-dimethylformamide, methanol was added to the solution to precipitate the dye. The precipitate was then washed with methanol and dried to obtain 120 mg of Dye S-17 (black crystals; m.p. above 250° C.).

$\lambda^{methanol}_{max}$: 525 nm

Example 12 (Synthesis of Dye S-24)

250 ml of methanol and 1 ml of triethylamine were added to 1 g of the rhodanine compound obtained in the same manner as in Example 11 step (1) and 1.45 g of 2-{6-(N-acetyl-N-phenylamino)-1,3,5-hexatrienyl}-3-ethylbenzothiazolium iodide, and the resulting mixture was refluxed for 2 hours and 20 minutes. After cooling the reaction solution, the precipitate formed was collected by filtration and washed with methanol to obtain 2 g of a crude dye. 10 ml of N,N-dimethylformamide was added to this crude dye, and the mixture was stirred, followed by removing insolubles by filtration. 90 ml of methanol was added to the filtrate, and the precipitate formed was collected by filtration and washed with methanol. This procedure was further repeated twice to obtain 40 mg of S-24 (black crystals; m.p. above 250° C.).

$\lambda^{methanol}_{max}$: 630 nm

Example 13 (Synthesis of Dye S-25)

(1) Synthesis of 3-{N-(2-mercaptobenzothiazol-6-yl)-carbamoyl}-rhodanine 200 ml of tetrahydrofuran was added to 1.8 g of 6-amino-2-mercaptobenzothiazole, and insolubles were removed by filtration. Then, 1.9 g of 3-carboxymethylrhodanine was added thereto to dissolve. 2 g of N,N-dicyclohexylcarbodiimide was added thereto and, after stirring for 7 hours at room temperature, insolubles formed were removed by filtration. The filtrate was concentrated under reduced pressure, ethyl acetate was added to the concentrate, followed by refluxing the resulting solution. Crystals formed were collected by filtration to obtain 2.1 g of 3-{N-(2-mercaptobenzothiazol-6-yl)carbamoyl}-rhodanine.

(2) Synthesis of S-25

150 ml of methanol and 0.4 ml of triethylamine were added to 0.5 g of the rhodanine compound obtained in (1) and 0.69 g of 2-{6-(N-acetyl-N-phenylamino)-1,3,5-hexatrienyl}-3-ethylbenzothiazolium iodide, and the resulting mixture was refluxed for 1 hour under heating. After allowing to cool, the precipitate formed was collected by filtration, then washed with methanol to obtain a crude dye. This dye was dissolved in N,N-dimethylformamide and diluted with methanol to precipitate it. This procedure of precipitation was repeated to purify. The precipitate was then purified by silica gel column chromatography (eluting solution: ethyl acetate-chloroform 9:1). Thus there was obtained 25 mg of S-25 as dark blue crystals. m.p. 212 to 217° C. $\lambda^{methanol}_{max}$: 630 nm

Example 14 (Synthesis of Dye S-31)

20 ml of N,N-dimethylacetamide and 0.17 ml of triethylamine were added to 0.5 g of 5-(6-(2-ethylbenzothiazol-2-ylidene)-2,4 hexadien-1-ylidene}-3-carboxymethylrhodanine, and cooled to -10° C. 0.12 ml of ethyl chloroformate was dropwise added thereto (during which the solution was cooled so as not to exceed -5° C.), and the solution was stirred for 15 minutes under cooling to -5° C. to -10° C. To this reaction solution was added a solution of 0.28 g of 2-(2-aminoethylthio)-5-mercapto-1,3,4-thiadiazole hydrochloride in a mixed solution of 15 ml of N,N-dimethylacetamide and 0.34 ml of triethylamine. Upon this addition, the solution temperature momentarily rose to 0° C. After cooling the solution for subsequent 10 minutes under ice-cooling, the solution was allowed to stand at room temperature. After heating at 50° C. for 15 minutes, the reaction solution was poured into 200 ml of water. Solids formed were collected by filtration, a small amount of N,N-dimethylformamide was added thereto and, after removing insolubles by filtration, the filtrate was diluted with methanol. The precipitate formed was again dissolved in N,N-dimethylformamide, and the solution was diluted with methanol to obtain 0.48 g of S-31. m.p. 150° to 155° C.

$\lambda^{methanol}_{max}$: 630 nm

Example 15

Compound S-31 was dissolved in a 1% solution of sodium acetate in methanol to prepare a 1/500 M solution, and this solution was dropped onto filter paper (No. 2; product of Toyo Filter Paper Co.) and air-dried. Thus, the filter paper was dyed blue.

Example 16

Compound S-24 and S-25 were respectively dissolved in N,N-dimethylformamide to prepare 1/500 M solutions. When 5×5 cm plain cotton cloth was dipped in the solutions and blast-dried in a 25° C. dark room. Thus, the cotton clothes were dyed light blue.

While the invention has been described in detail and with reference to specific embodiments thereof, it will be apparent to one skilled in the art that various changes and modifications can be made therein without departing from the spirit and scope thereof.

What is claimed is:

1. Methine compounds represented by the formula (VII):

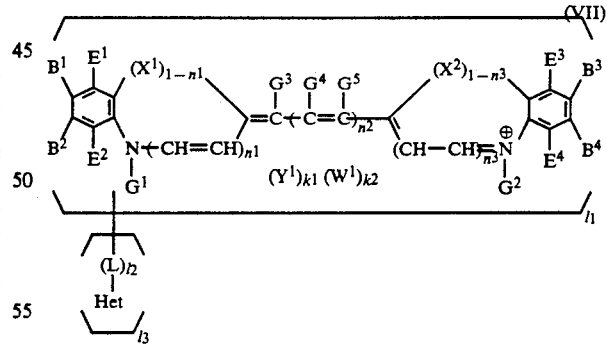

wherein $X^1$ and $S^2$, which may be the same or different, each represents a sulfur atom, an oxygen atom, a selenium atom,

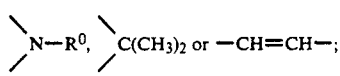

$G^1$, $G^2$ and $R^0$, which may be the same or different, each represents an alkyl group, an aryl group, a divalent linkage group L, or a single bond;

$G^3$ represents a hydrogen atom or a lower alkyl group containing up to 8 carbon atoms or a divalent linkage group L or a single bond;

$G^4$ and $G^5$ each represents a hydrogen atom, a lower alkyl group containing up to 8 carbon atoms, or, when $n^2$ represents 2 or more, $G^3$ and the nearest $G^5$, and/or $G^4$ and another $G^4$, and/or $G^5$ and another $G^5$ are linked to each other to form a 5- or 6-membered ring optionally containing an oxygen atom, a sulfur atom and/or a nitrogen atom as a ring-constituting atom, or may represent a linkage group L or a single bond;

$n^1$ and $n^3$, which may be the same or different, each represents 0 or 1;

$n^2$ represents 0, 1, 2, 3, or 4;

$Y^1$ represents a cationic group, $W^1$ represents an anionic group, and $k^1$ and $k^2$ each represents 0 or 1 as necessary to form a salt depending upon the valence of the ionic group;

$B^1$, $B^2$, $B^3$, $B^4$, $E^1$, $E^2$, $E^3$ and $E^4$ each represents a hydrogen atom, a halogen atom, a hydroxy group, a cyano group, a trifluoromethyl group, a nitro group, a methylenedioxy group, a carboxyl group, a sulfo group, a substituted or unsubstituted alkyl group containing up to 10 carbon atoms, a substituted or unsubstituted aryl group containing up to 10 carbon atoms, a substituted or unsubstituted alkoxy group containing up to 10 carbon atoms, an alkylthio group containing up to 8 carbon atoms, an arylthio group containing up to 8 carbon atoms, an acylamino group containing up to 8 carbon atoms, an alkoxycarbonyl group containing up to 8 carbon atoms or an acyl group containing up to 10 carbon atoms, or represents a divalent linkage group L or a single bond, wherein at least one of $B^1$, $B^2$, $B^3$, $B^4$, $E^1$, $E^2$, $E^3$, $E^4$, $G^1$, $G^2$, $G^3$, $G^4$ and $R^0$ is chemically bound to at least one of $V_1$, $V_2$, $V_3$ and $V_4$ of the compound represented by general formula (II) through a divalent linkage group L or a single bond;

L represents a divalent group composed of an atom or atoms containing at least one atom selected from a carbon atom, a nitrogen atom, a sulfur atom and an oxygen atom; $l_1$ represents 1 or 2, $l_2$ represents 0 or 1, and $l_3$ represents 1, 2 or 3;

Het is represented by the following formula (II):

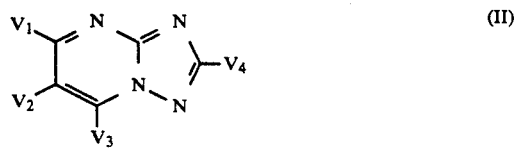

wherein $V_1$, $V_2$, $V_3$ and $V_4$ each represents a hydrogen atom, a substituted or unsubstituted alkyl group, a substituted or unsubstituted aryl group, a halogen atom or a mercapto group.

2. Methine dyes represented by the formula (VII):

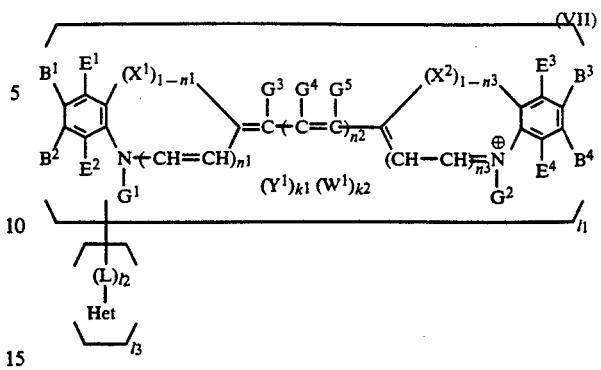

wherein $X^1$ and $X^2$, which may be the same or different, each represents a sulfur atom, an oxygen atom, a selenium atom,

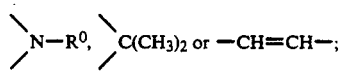

$G^1$, $G^2$ and $R^0$, which may be the same or different, each represents an alkyl group, an aryl group, a divalent linkage group L, or a single bond;

$G^3$ represents a hydrogen atom or a lower alkyl group containing up to 8 carbon atoms or a divalent linkage group L or a single bond;

$G^4$ and $G^5$ each represents a hydrogen atom, a lower alkyl group containing up to 8 carbon atoms, or, when $n^2$ represents 2 or more, $G^3$ and the nearest $G^5$, and/or $G^4$ and another $G^4$, and/or $G^5$ and another $G^5$ are linked to each other to form a 5- or 6-membered ring optionally containing an oxygen atom, a sulfur atom and/or a nitrogen atom as a ring-constituting atom, or may represent a linkage group L or a single bond;

$n^1$ and $n^3$, which may be the same or different, each represents 0 or 1;

$n^2$ represents 0, 1, 2, 3, or 4;

$Y^1$ represents a cationic group, $W^1$ represents an anionic group, and $k^1$ and $k^2$ each represents 0 or 1 as necessary to form a salt depending upon the valence of the ionic group;

$B^1$, $B^2$, $B^3$, $B^4$, $E^1$, $E^2$, $E^3$ and $E^4$ each represents a hydrogen atom, a halogen atom, a hydroxy group, a cyano group, a trifluoromethyl group, a nitro group, a methylenedioxy group, a carboxyl group, a sulfo group, a substituted or unsubstituted alkyl group containing up to 10 carbon atoms, a substituted or unsubstituted alkoxy group containing up to 10 carbon atoms, a substituted or unsubstituted alkoxy group containing up to 10 carbon atoms, an alkylthio group containing up to 8 carbon atoms, an arylthio group containing up to 8 carbon atoms, an acylamino group containing up to 8 carbon atoms, an alkoxycarbonyl group containing up to 8 carbon atoms or an acyl group containing up to 10 carbon atoms, or represents a divalent linkage group L or a single bond, wherein at least one of $B^1$, $B^2$, $B^3$, $B^4$, $E^1$, $E^2$, $E^3$, $E^4$, $G^1$, $G^2$, $G^3$, $G^4$ and $R^0$ is chemically bound to at least one of $V_1$, $V_2$, $V_3$ and $V_4$ of the compound represented by the general formula (II) through a divalent linkage group L or a single bond;

L represents a divalent linkage group composed of an atom or atoms containing at least one atom selected from a carbon atom, a nitrogen atom, a sulfur atom and an oxygen atom; l, represents 1 or 2, l$_2$ represents 0 or 1, and l$_3$ represents 1, 2 or 3;

Het is represented by the following formula (II):

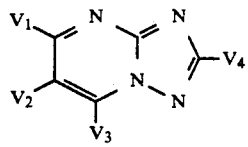

wherein $V_1$, $V_2$, $V_3$ and $V_4$ each represents a hydrogen atom, a substituted or unsubstituted alkyl group, a substituted or unsubstituted aryl group, a halogen atom or a mercapto group.

* * * * *